United States Patent [19]

Worley et al.

[11] 4,253,487

[45] Mar. 3, 1981

[54] MULTI-POSITION DUAL DISC SLIDE VALVE

[75] Inventors: Arthur C. Worley, Morristown, N.J.; Charles B. Colton, Randallstown, Md.

[73] Assignee: Exxon Research & Engineering Co., Florham Park, N.J.

[21] Appl. No.: 960,049

[22] Filed: Nov. 13, 1978

Related U.S. Application Data

[63] Continuation of Ser. No. 747,411, Dec. 21, 1976, abandoned.

[51] Int. Cl.³ .............................................. F16K 25/04
[52] U.S. Cl. ..................................... 137/375; 251/212
[58] Field of Search ........................... 137/375, 329.05; 251/212

[56] References Cited

U.S. PATENT DOCUMENTS

| | | | |
|---|---|---|---|
| 2,575,464 | 11/1951 | Olsen | 137/375 |
| 2,636,712 | 4/1953 | Lubbock | 137/329.05 |
| 3,595,521 | 7/1971 | Lorentz | 251/212 |
| 3,726,306 | 4/1973 | Purvis | 137/375 |
| 3,837,356 | 9/1974 | Selep et al. | 137/375 |
| 3,964,507 | 6/1976 | Jandrasi et al. | 137/375 |
| 3,976,094 | 8/1976 | Jandrasi et al. | 251/212 X |

Primary Examiner—Arnold Rosenthal
Attorney, Agent, or Firm—F. Donald Paris

[57] ABSTRACT

A slide valve for use in throttling solids flow, preferably including a pair of opposed discs. The valve discs are in bearing contact with the valve seat and effectively will operate with the valve in almost any position. The internal valve construction and arrangement is unitized which simplifies removal of the internals as a single assembly, and permits quick reassembly as well as adjustment. The discs are retained by guide bars to insure that disc movement is essentially limited to a back and forth motion. The valve discs according to the invention can be centered in the valve so that the discharge is centered in the conduit in which they are mounted, thereby reducing flow impingement on the conduit wall to avoid or minimize erosion, or they can be operated singly and/or independently or in conjunction with each other in order to provide desired flow control. With single disc operation, one disc may be retracted and control achieved by throttling with the other disc against part of the seat. The discs automatically are actuated by suitable operators to provide a variable flow area between them. The load bearing and guide surfaces are protected from erosion by appropriately located hard-surfacing and integrally reinforced refractory.

24 Claims, 17 Drawing Figures

MULTI-POSITION DUAL DISC SLIDE VALVE

This is a continuation of application Ser. No. 747,411, filed Dec. 21, 1976, now abandoned.

BACKGROUND OF THE INVENTION

Slide valves generally are used for three general types of services including the throttling of flue gas containing solid particles, and the throttling and/or blocking of solids flow. This type of valve is used extensively in fluid catalytic cracking units (FCCU$_s$), fluid coking units (FCU's), fluidized iron ore units (FIOR's) and other fluidized solids units where service conditions may vary between ambient and 1600° F. over long periods of time and as high as 1800° F. for a short time and pressures range from 0 to 250 psig. In these processes, the operating pressure is controlled by throttling the flow. Of course slide valves also have utility in various other processes. Presently, three basic types of valves are used in the type of environment discussed above, including different configurations for vertical and horizontal conduits to account for the orientation of the valve. A conventional slide valve configuration with the disc(s) in a tongue and groove guide arrangement is disclosed in U.S. Pat. No. 3,726,306. Another prior art disclosure of a tongue and groove construction is illustrated in U.S. Pat. No. 3,964,507.

In the case of fluid solids flow, both blocking and throttling valves are used. Generally, however, blocking of solids flow is accomplished by employing a single disc-type valve which covers an opening provided in a fixed orifice plate. The valve usually offers no restriction to flow when it is fully opened, i.e., the orifice opening is equal to the line diameter. Conventional throttling slide valves operate with a reduced port or opening in order to achieve the desired flow control. The orifice generally is considerably less than the line diameter depending upon the pressure drop required for proper operation. Because the valves are subject to substantially constant (solids) particle flow impingement at elevated temperatures which are high enough to significantly reduce the physical strength and hardness of the valve material, erosion of these valves is likely to occur. Erosion can substantially reduce the operating life of this key piece of equipment, which can present a major problem since the valves are a critical component of process units whose economic success is dependent on long-term uninterrupted operation. Typical prior art valves which have been employed are disclosed in U.S. Pat. Nos. 2,217,834; 2,614,789; 2,636,712; and 3,370,610.

Of these prior art patents, Lubbock, U.S. Pat. No. 2,636,712, which is assigned to the assignee of the present invention, appears most pertinent in that it discloses a slide valve/internals configuration for the flow control of solids. However, the primary emphasis of Lubbock is to compensate for erosion of valve internals by repositioning the discs relative to the seat. One or a plurality of ports (seats) can be provided in the valve orifice plates. The slides are spaced apart a desired distance to provide the desired orifice flow area. As the slides and/or orifice plates erode in the area of flow, the slide discs are moved (with the distance between maintained) relative to the openings in the orifice plate so that the eroded areas of the valve internals are removed from the flow exposure and different nonworn portions of the valve are exposed to the erosive action of the flow. Neither Lubbock or the other prior art valves have the specific construction details of the present invention or provide for a variable flow area or other advantages afforded thereby.

SUMMARY OF THE INVENTION

Accordingly, it is a primary object of the present invention to provide a slide valve which will avoid the deficiences of the prior art valves described heretofore.

Another primary object of the present invention is to provide a slide valve which will operate in substantially any position.

A further primary object of the present invention is to provide an improved slide valve having capability to provide a variable flow area.

A further object is to provide a slide valve having a unitized internal construction which simplifies removal of the internals and permits easy reassembly and adjustment.

Another object of the invention is to provide a slide valve with improved erosion protection.

Still yet a further object of the present invention is to provide an improved slide valve wherein the slides are in bearing contact with the valve seat and the movement of the discs is restrained to a back and forth motion, and is capable of use with substantially any valve operator.

According to the present invention, there is provided a multi-position double disc slide valve which is especially useful in erosive and/or high temperature service. The valve has a fixed orifice and a pair of solid discs which are restrained for back and forth, i.e., reciprocating, movement for creating a variable size flow orifice which makes the valves suitable for either throttling or blocking service. The discs are not capable of achieving gas tight shutoff because of inadequate seating force developed between the discs and the seat by the differential pressure and/or the sealing surfaces cannot be economically fabricated to the necessary tolerances. They are automatically actuated by the suitable conventional operators such as air motor, hydraulic cylinder, pneumatic cylinder and/or diaphragms and the like. Because of their unique construction and arrangement, the valves are particularly effective and useful under extremely erosive conditions such as fluidized solids service. Each of the discs employ a separate operator which increases reliability of the valves. This allows one operator can be serviced while the other is in operation. When throttling, the valve discs are supported by and are in intimate, direct bearing contact with the orifice plate or seat, whether the valve is mounted in a horizontal or vertical line, with downflow, or in any intermediate position. When the valve is in the closed position but without differential pressure forcing the discs against the seat the guides prevent the discs from disengagement for valves installed in horizontal lines. Erosion control of the valve internals is accomplished by refractory (integrally reinforced) and hard surfacing on the discs and orifice plate (seat). The valve body is protected with refractory linings. The internals of the valve which are susceptible to erosion are designed with a unitized feature to facilitate their replacement in a simple manner without the need for removal of the complete valve from the line. These parts include the orifice plate, the discs, and the guides which are secured together by bolting into an assembly as a unit. In those instances where severe erosion is anticipated, i.e., high differential pressure across the variable orifice in a line containing flow with high solids content, a number of conventional throttling valves (e.g., single disc slide valves) in series have been required to insure a reasonable time period between plant shutdowns. Where space limitations do not permit the installation of two or more single disc slide valves in series, a double disc throttling slide valve according to the present invention can be used. The double disc valve then can throttle with one of its slides, while the other slide is maintained in a fully opened position. When the flow control is impaired because of erosion of the active or operating disc and the corresponding section of the fixed orifice (seat), the eroded disc can be moved to its full open position while flow control is assumed with the other uneroded slide and uneroded fixed orifice plate. This capability allows the subject invention to provide the service life of two conventional single slide valves in the space of one valve or the service life of four conventional valves in the space required for two valves.

Thus, it is apparent that a valve constructed according to the present invention provides a valve design with features which afford low operating costs and relatively trouble-free maintenance. The valve will operate in essentially any position in comparison to conventional valvees which now are almost exclusively used in only vertical lines. The internals are easily removed through a detachable bonnet which allows the valve body to be welded into the line to make it leakfree, in place of using a conventional flange configuration, i.e., bolted line construction for high temperature service which is subject to leakage. The use of such a unitized internal valve construction in downflow and horizontal line valve applications, simplifies the removal and replacement of internals, i.e., one assembly through the use of spares. This configuration permits repair, reassembly and adjustment in the shop during unit operation, thus avoiding rush type reconditioning without increasing the initial valve cost. The unitized construction permits simplified and therefore, more reliable guiding of the valve movement. Only one critical dimensional clearance is required in comparison to conventional valves which require at least three such dimensional clearances. The operators for the valves have broad flexibility and may comprise any one of a variety of conventional systems (e.g., hydraulic, pneumatic, etc.).

Having in mind the foregoing that will be evident from an understanding of this disclosure, the invention comprises the construction and arrangement of parts for a valve and its use in fluid solid service as disclosed in the preferred embodiment of the invention, which is hereinafter set forth in such detail as to enable those skilled in the art readily to understand the function, operation, construction and advantages of it when read in conjunction with the accompanying drawings.

DESCRIPTION OF THE PREFERRED EMBODIMENT

Figures 1, 5:
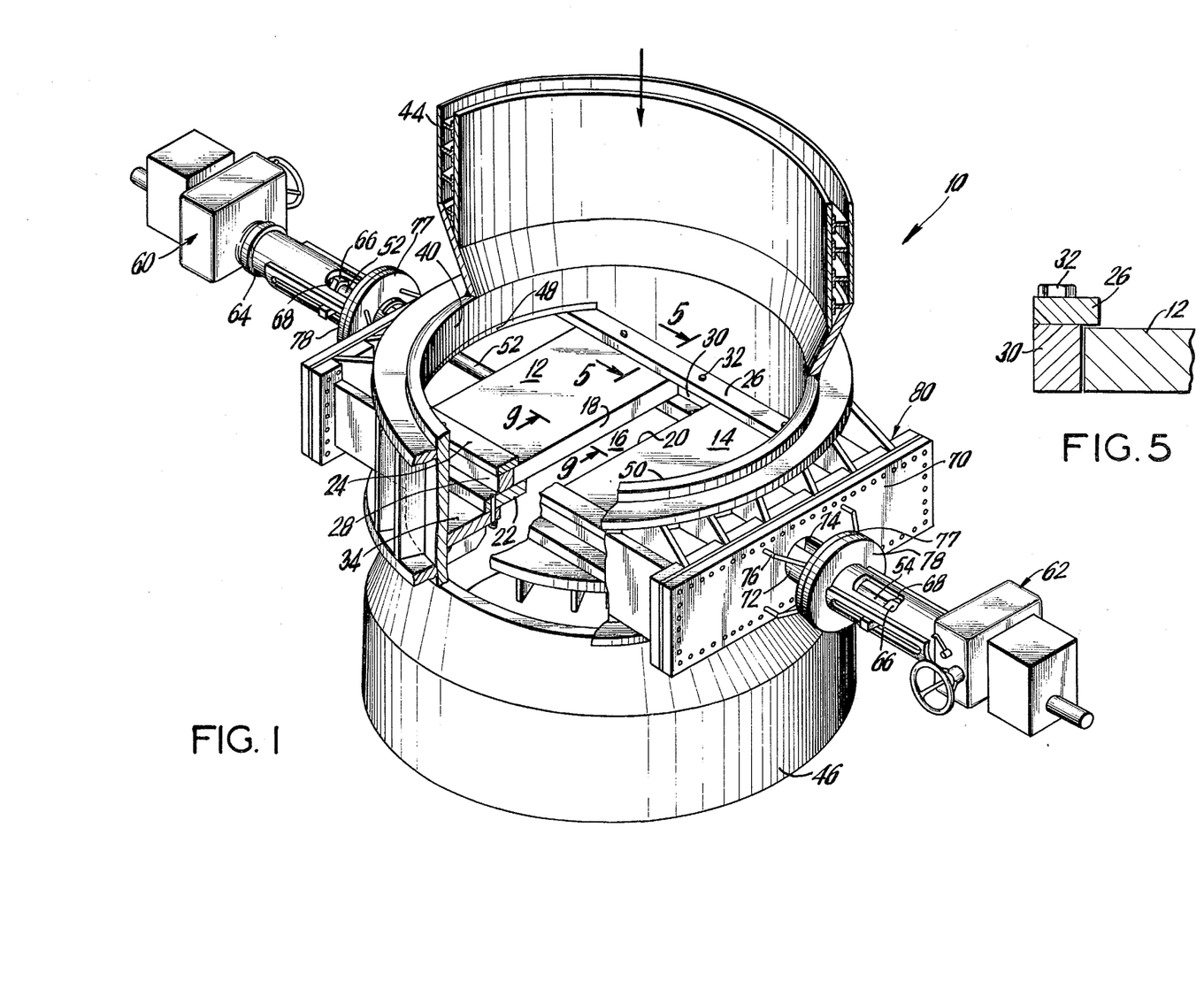
FIG. 1 is a perspective view of a preferred embodiment of a valve constructed and arranged according to the present invention for use in fluids solid service.
FIG. 5 is a cross-sectional view taken substantially on the line 5—5 of FIG. 1.
Figure 6:
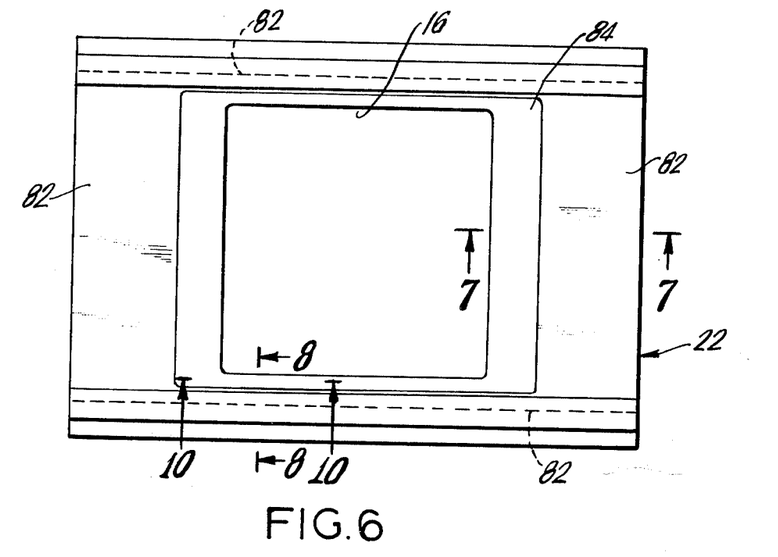
FIG. 6 is a top view of the fixed orifice plate used in the valve of the present invention.
Figure 7:
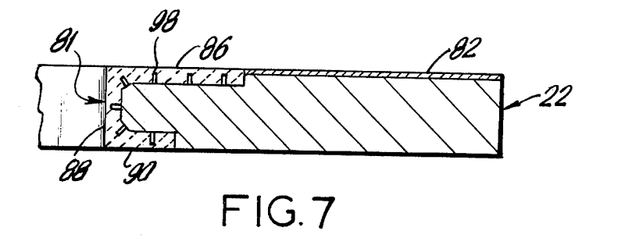
FIG. 7 is a cross-sectional view taken substantially on the line 7—7 of FIG. 6.
Figure 8:
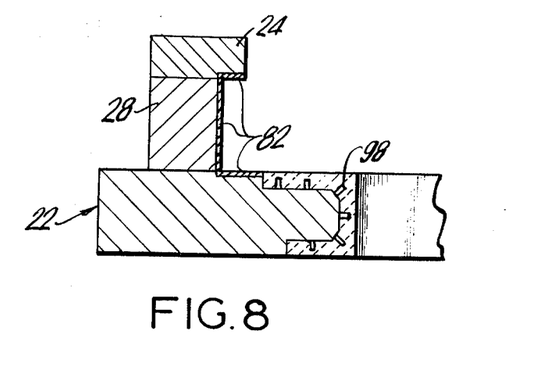
FIG. 8 is a cross-sectional view taken substantially on the line 8—8 of FIG. 6.
Figure 9:
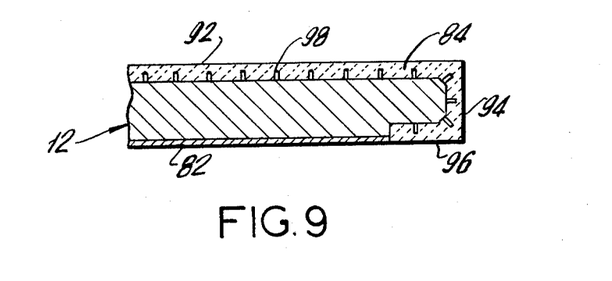
FIG. 9 is a cross-sectional view of a portion of the disc taken substantially along the line 9—9 of FIG. 1.
Figure 10:
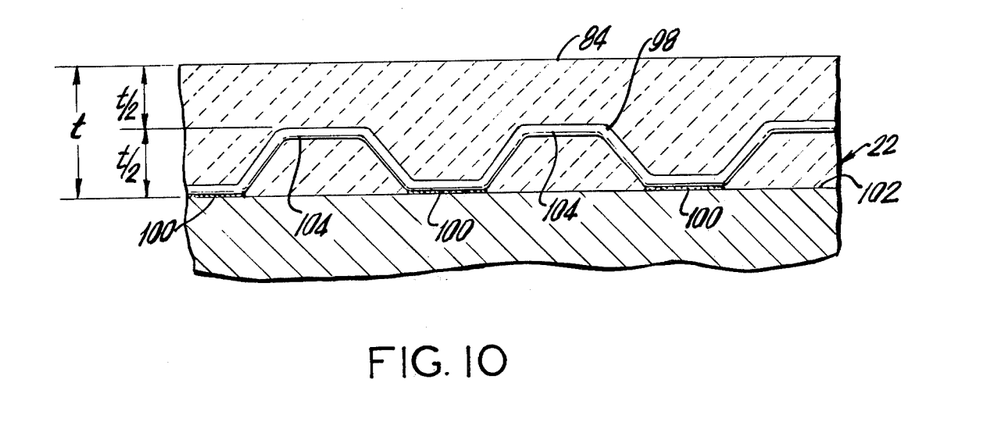
FIG. 10 is a cross-sectional elevation view of reinforced refractory illustrating the anchors according to the present invention taken substantially on the line 10—10 of FIG. 6.

Referring now to the drawings wherein like parts are designated by the same reference numeral throughout the several views, there is disclosed a multi-position slide valve 10 which is particularly adapted to fluid solid service, especially for throttling flow and more particularly for use in controlling the flow of erosive fluids which contain solids. The valve basically comprises a pair of discs 12, 14 which are located diametrically opposite each other across a valve orifice 16 with fixed dimensions. Each slide bears or rests directly on the orifice plate 22. In operation one of the discs can be removed from the flow path (shown downward by the arrow, although flow can be in other directions depending on line orientation) while the other is used for flow control and when the used slide is eroded too much for effective control, it can be positioned away from the flow path and the other disc used in lieu thereof. Alternatively, both of the discs can be employed to control flow through the orifice. As shown in FIG. 1, the valve generally designated 10 comprises the pair of opposed solid disc members 12 and 14 having a generally rectangular cross-section, with each of the discs squared or straight along its inner or leading edge. This applies primarily to solids flow throttling type valves which block solids flow when the discs are in closed position. When the leading opposed edges of the discs are spaced apart a predetermined distance, they effectively provide the desired orifice opening between the discs. A rectangular shaped orifice opening 16 (see FIG. 6) is formed centrally in the orifice plate 22 which is disposed on the underside of the discs and is in direct or contiguous sliding contact or relation with the disc members 12 and 14. On the upper side of the disc members 12 and 14 and disposed adjacent to the transverse sides or edges thereof are a pair of essentially parallel elongated guide bars 24 and 26 which insure that the movement of the slides will be limited to a back and forth motion, thus effectively preventing undesired up and down movement. Side retainer bars 28 and 30 (see FIGS. 5 and 8)

are secured with the upper guide bars and are located directly below them along the transverse edges of the discs for containing the disc and preventing substantial undesired side to side movement. The transverse spacing is in the range of between about ⅛" to about 3/16". By this type of disc containment only one truly critical clearance is required by comparison to the three critical clearances normally required in conventional slide valve designs. Thus, the only critical clearance for slide valves according to the present invention is that between the undersurface of the upper guides 24, 26 and the upper surface of the disc members 12, 14, which preferably should have a tolerance range of ±0.005 inches. In the typical tongue-in-groove type arrangement, e.g., see U.S. Pat. No. 3,726,306, tolerances must be maintained not only for this particular dimension but also between the disc(s) and the fixed orifice plate (vertical) and between the discs and the tongue-and-groove guides in the horizontal direction on each side of the discs. The typical movement of the discs can best be seen by reference to FIG. 2, wherein the discs 12, 14 shown in solid lines correspond to the positions shown in FIG. 1. When the discs are moved inwardly toward each other so that their leading edge surfaces 18 and 20 contact each other the valve is in the closed position.

Figures 2, 2A, 4:
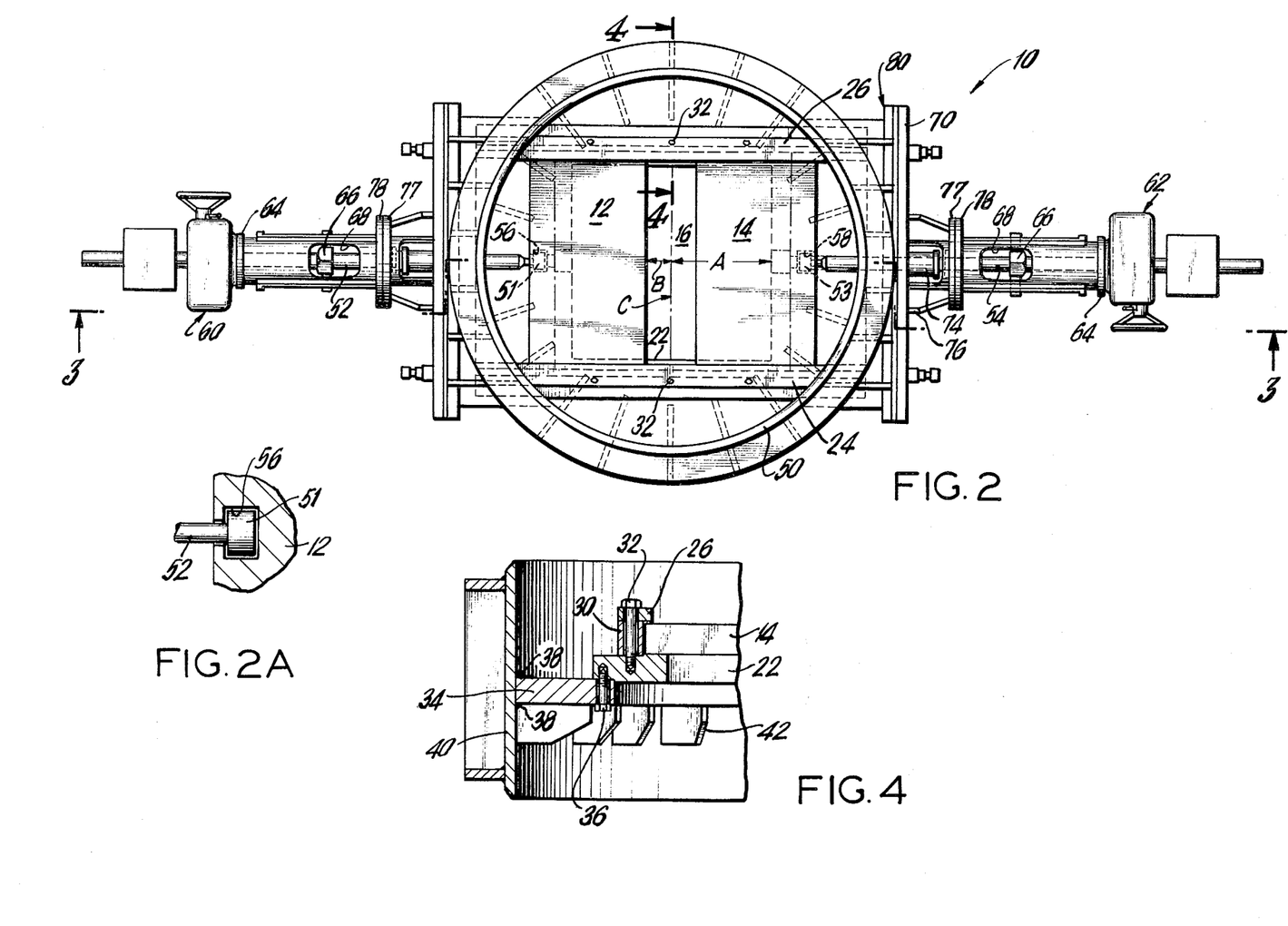
FIG. 2 is a top plan view of the valve of FIG. 1.
FIG. 2A shows the operator stem connection with the valve disc.
FIG. 4 is a cross-sectional view taken substantially along the line 4—4 of FIG. 2.
Figure 3:
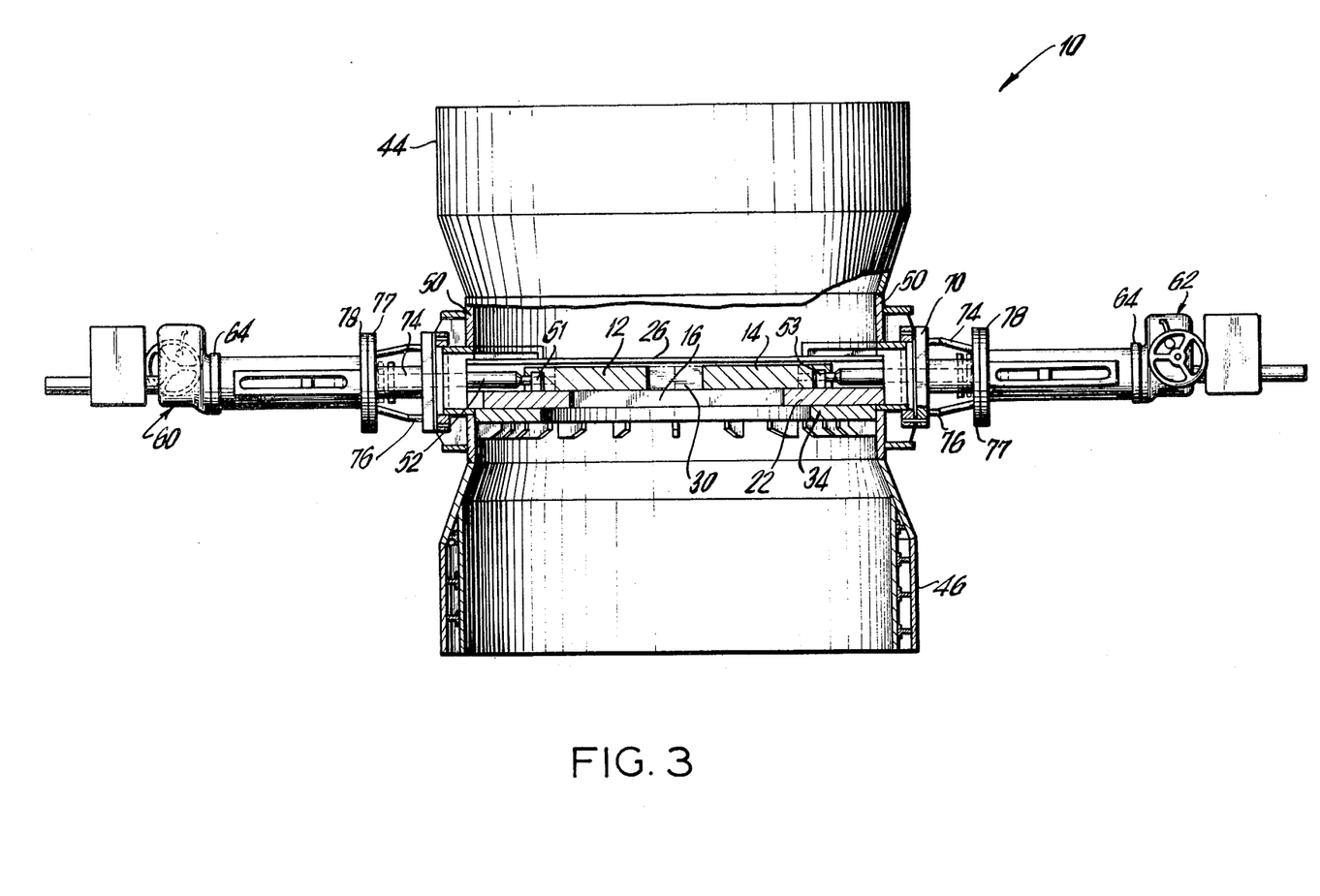
FIG. 3 is a cross-sectional view taken substantially along the line 3—3 of FIG. 2.
Figure 14:
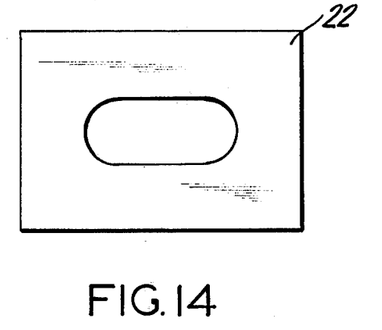
FIG. 14 is a schematic top plan view of a fixed orifice plate having an oblong opening.
Figure 15:
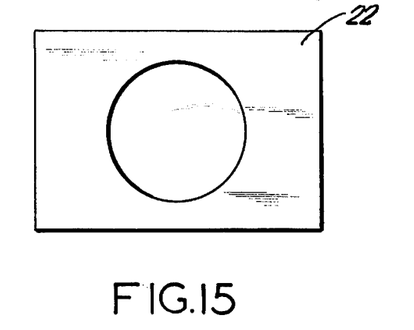
FIG. 15 is a schematic top plan view of a fixed orifice plate having a circular opening.
Figure 16:
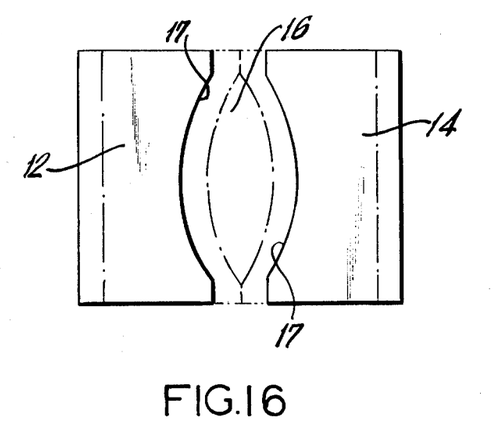
FIG. 16 is a top plan view of an alternate embodiment of the valve discs having concave leading edges for throttling use.

As further shown in FIG. 2, the line A is representative of the maximum opening between the discs, whereas line B represents the opening normally employed during operation of the valve. The dotted centerline C represents the center of the fixed orifice opening 16 and corresponds to total valve closure, i.e., there is no minimum opening for the type of disc design where the leading disc edges are in abutting contact (e.g. squared or straight edge). If the length of the discs is equal to or slightly greater than the maximum orifice diameter or opening, then only one of the discs can be used to close the valve provided that the other disc has been placed in a fully retracted position. Other variations in the size of the disc are, of course, possible and will occur to those skilled in the art in order to accommodate a desired flow pattern. An alternate embodiment for the discs is shown in FIG. 16 wherein the leading edge of each disc includes a concave portion 17 which is centrally located of the disc sides. This construction is useful when there is no need for shut-off since these always will be a minimum opening (shown by the dotted line) with the discs in their innermost or closed position. Thus, it will have utility when throttling is desired (e.g. flue gas pressure control). The upper and transverse disc guide bars are secured together by means of a plurality of threaded bolts 32 such as shown in FIG. 4. The annular orifice plate 22 is mounted to a lower annular support member 34 by means of bolting as shown by 36 and extends radially inward therefrom about the fixed orifice 16 (e.g. rectangular). Although in the preferred embodiment the orifice opening is shown as substantially rectangular, it is within the scope of this invention and contemplated to have other shapes. For example, the opening may be oblong (see FIG. 14) or circular (see FIG. 15). The fixed opening by having its major axis aligned in the direction of the valve stems will insure a more centralized flow from the variable orifice between the discs to minimize erosive impingement of solids on the valve body. Of course, the fixed orifice opening is sized to provide desired rangeability and control of the flow. The outer end of the annular support 34 is welded about its periphery shown at 38 to the inner wall of the generally circular cylindrical valve body 40 which contains the orifice plate, discs and guides. The support 34 is additionally supported on its underside by a plurality of circumferentially spaced radial-extended gussets 42. The valve body is connected at one side (the inlet in the preferred embodiment) to the carbon steel line 44 which forms part of the process flow line in which the valve is used and at its bottom or outlet side is connected to another carbon steel line 46.

The valve discs generally operate or move in a plane perpendicular with respect to the process flow through the line. In the valve body there are a pair of diagonally opposite openings 48, 50 which accommodate the back and forth or reciprocating movement of the respective discs. Through these openings extend stems 52 which are connected at one end by "Tee" bar ends, 51 and 53 in recesses 56 and 58 (see FIG. 2A) respectively in the discs 12 and 14 and at their other end or outer extremities to operators 60 and 62 in a conventional manner. As previously explained, the operator may be of the pneumatic, hydraulic or other conventional type, e.g., air motor, electric motor, hydraulic or air piston/cylinder system or diaphragm. The operators 60 and 62 are identical and both are connected to the discs in the same manner. The stems 52 pass through pedestals 64. Coaxial with the stems are anti-rotation nuts 66 which prevents any tendency of the stems to turn or rotate as the disc reciprocates, which in turn prevents any rotational tendencies of the disc members. The nuts 66 are contained within a groove 68 provided in the pedestals. During valve operation diagonally opposite openings 48, 50 in the valve body, are covered by rectangular bonnet covers 70 having a central opening 72 in which is mounted a standard stuffing box 74 (i.e., compressible packing rings arranged around stems 52 which pass through opening 72 and concentrically through 74). The stuffing box is secured to the mounting cover by welding. Brackets 76 reinforce the pedestal base flanges 77 and 78. The bonnet cover 70 is removably mounted by means of bolts disposed about its perimeter and secured to the extended bonnet flange 80 and gussets. The bonnet cover and mounting supports the operators radially outward from the valve body. Appropriate connections are made to power the operator hydraulically, by air, electrically, etc., as the case may be.

Thus, it is seen that a double disc arrangement according to the present invention can center the discharge flow in the process line, which substantially reduces flow impingement on the inner pipe walls. The discs can be used for throttling by maintaining one disc for throttling purposes with the other maintained in a full open position, i.e., fully withdrawn, and when erosion limits the flow control attainable the eroded disc is moved to its full open position and the other or second disc then is used to control the flow. This is essentially like having two valves in one and makes the valve especially suitable for applications where long operating periods (runs) are desired, but space limitations preclude installation of a second or third valve. Also, by ensuring that the discs are always in contact with the seat regardless of the valve orientation, erosion resulting from bypass flow between the discs and seat is avoided (in conventional valve a clearance is provided which permits such flow). While the disc and seat may not always be in intimate contact, e.g., when the valve is mounted in a vertical line with upward flow, the valve still will operate satisfactory in such orientation so long as the pressure drop across the valve is greater than the opposite weight effect of the discs, which is a matter of design within the scope of the invention. This pressure differential will cause the discs to maintain bearing contact with the orifice plate. When the slides are in bearing contact, any flow which might normally bypass between the disc and the seat is thus eliminated. Also, because of this large surface to surface contact, the thrust force due to the differential pressure drop across the valve is carried by the seat and not by the valve discs or guides. This then permits a reduction in the thickness of the discs which are fully supported by the seat. In conventional valves the discs are supported by the tongue and groove guides at the extreme width of the discs thereby subjecting the discs to the full pressure thrust in a bending mode of loading. Maintenance of the valve according to the present invention is particularly simplified because of its unitized internal construction and is facilitated by the full access bonnet opening through which the internals assembly can be removed as a single unit after unbolting the bolts 36 and removing the bonnet cover. To reduce the cost one large bonnet can be used rather than two. For the latter case the stuffing box 74 is provided directly in the valve body as well as the support arrangement 77 and 78 for the operator pedestal 64.

The desired erosion protection is accomplished by providing hardsurfacing and integrally reinforced refractory as discussed in detail hereinafter. The hardsurfacing may comprise a material such as Stellite 6 or some other suitable anti-galling material, i.e., on which would prevent the well-known phenomenon of welding of the sliding materials together. Stellite 6 is a high temperature hard surfacing material which is applied by a welding process and is characterized by being an extremely hard and wear resistant coating. The hardsurfacing which is designated by 82 throughout is employed on all of the load bearing surfaces of the fixed orifice, on the guide surfaces facing the discs and on the load bearing surfaces of the discs which face the orifice plate, and is best shown in FIGS. 6 through 9. On the orifice plate 22 the hardsurfacing 32 is disposed about the plate periphery and extends outward of the orifice periphery, adjacent to either end and adjacent the guides on either side of the plate.

Figure 11:
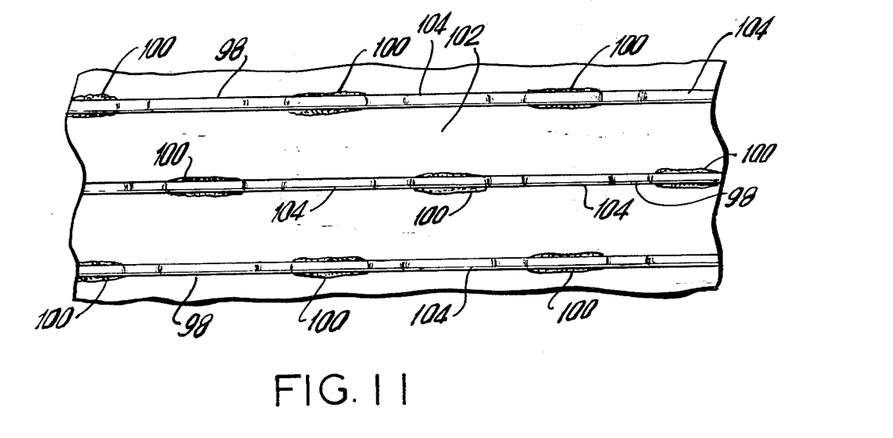
FIG. 11 is a top view illustrating the reinforced refractory anchor arrangement of FIG. 10 according to the present invention.
Figure 12:
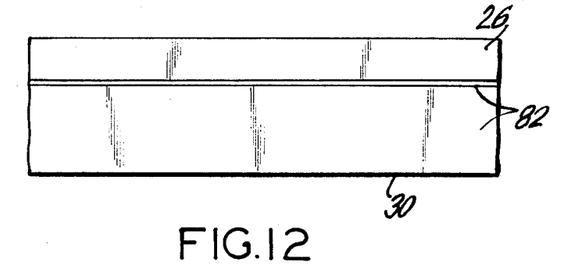
FIGS. 12 and 13 are elevational view of the disc guide illustrating the hard surfacing areas thereon.
Figure 13:
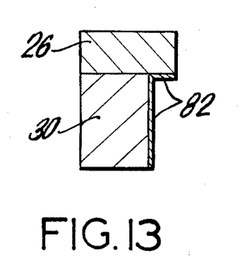

Reinforced refractory generally designated 84 is also disposed about and directly adjacent the orifice opening 16 on all sides thereof inward of the hardsurfacing. While various types of refractory can be used, a suitable one may basically comprise a high alumina chemical setting refractory with at least 89% tubular alumina. The refractory is compounded with phosphoric acid to develop suitable bonding. A number of commercially available refractories used for this type of service are made by Refractories Specialties Co. (Resco) A22 and Babcock and Wilcox Kosphos 30. The refractory is integrally reinforced with well-distributed alloy fibers which are approximately $\frac{3}{4}''$ to $1''$ long and of $0.010''$–$0.013''$ diameter or with a rectangular cross section approximately $0.010'' \times 0.030''$. The fibers are added to the refractory while it is being mixed at a typical ratio of between $\frac{1}{2}$ volume % to 2 volume %. The former represents a weight of 2.4 pounds of fiber per cubic foot of refractory, while the latter is 9.6 pounds per cubic foot of refractory. The reinforced refractory 84 is disposed on the load bearing top side of the orifice plate 22 at 86 surrounding the orifice opening 16, wrapping around the vertical walls at 88 defining the opening 16, and extending along the bottom side of the plate at 90 directly adjacent the opening. See FIGS. 6 and 7. In a typical construction, the refractory 84 extends from the opening 16 outward about $8''$ on the top side and approximately $4''$ on the bottom side. On the discs 12, 14 (see FIG. 9), the refractory 84 is disposed completely on the top side at 92 and on the side surface at 94, as well as for about $4''$ inwardly from the ends on the bottom side as sown at 96. The construction of the discs is identical and therefore, only one is illustrated and discussed in detail. Also on the bottom surface disc inward of the refractory is the hardsurfacing 82, since that portion is in contact with the orifice plate 22. Typically, the refractory lining has a thickness of $2''$ and is supported and fastened in place by a plurality of wire anchor loops 98 which are welded as shown at 100 to the surface 102 of the valve which are to be refractory lined. These loops may, for example, comprise $\frac{1}{8}''$ diameter wire welded at their contact point with the valve surface and extending longitudinally in transverse spaced relation. The loops would extend with their raised portions or lands shown at 104 located about midway of the thickness of the reinforced lining, being welded in place to the valve surface at their contact points. The wire loops can be transversely spaced apart approximately $3''$ and are staggered longitudinally so that for adjacent loops the welds of one are generally opposite the raised portion of the other, as best shown in FIG. 11.

While a particular preferred embodiment of the invention has been shown and described and certain modifications thereof suggested, it will be understood that the true spirit and scope of the invention as set forth in the appended claims which embrace other modifications and embodiments which will occur to those of ordinary skill in the art.

Having thus set forth the invention, what is claimed herein is:

1. An improved slide valve adapted for use in the control of processes containing fluid flow with erosive materials and at high temperatures comprising in combination:

(a) a valve body comprising a wall defining a central flow passage along a main axis connected by an inlet and outlet for flow in only a single direction from said inlet to said outlet and including opposed openings in said wall transverse of said main axis;

(b) an orifice plate removably mounted in said valve body between said inlet and outlet and including an orifice opening of fixed dimensions and substantially perpendicular with respect to said main axis, said orifice plate having an inlet side which always faces said inlet and an outlet side which always faces said outlet;

(c) a pair of opposed disc members, each of predetermined thickness, mounted in said valve body in substantially the same plane as said opposed openings for sliding movement in a direction perpendicular to said main axis of said central flow passage, said disc members located only on said inlet side of said orifice plate and arranged in direct surface bearing contact with said inlet side of said orifice plate for substantially eliminating clearances and fluid bypass between said disc members and said orifice plate, said members constructed and arranged for providing a variable flow area between opposed inner edges with respect to said passage and each member having first and second opposed surfaces spaced apart a distance corresponding to said thickness disposed substantially perpendicular with respect to said main axis, and each said member also having opposed transverse sides which are coextensive with said thickness between said first and second surfaces and are each disposed in a single plane at least for said thickness;

(d) guide means secured with said valve body only on said inlet side of said orifice plate for constraining movement of said discs to a predetermined path substantially in the plane of said opposed openings in said valve body and preventing substantial transverse movement of said discs, and defining together with a portion of said inlet side of said orifice plate the path of movement of said discs; and (e) operator means connected for selectively moving each of said discs.

2. The valve of claim 1 including removable cover means externally disposed of said valve body over said openings for facilitating removal of said disc members, said orifice plate and said guide means from within said valve body.

3. The valve of claim 2 wherein each of said disc members include on their inner edges a flat portion extending from opposite transverse sides thereof inwardly toward said main axis for a predetermined distance and a concave portion being disposed between said flat portions on each of said disc members.

4. The valve of claim 1 wherein said guide means comprises a transverse member having a flat inner surface and a guide member extending inwardly toward said main axis and secured with said transverse member on opposite sides of the path of movement of said disc members for constraining movement of said members to a substantially reciprocating motion, said flat inner surface extending toward said inlet for the full height of said disc member and said guide member overlying at least a portion of the surface of said disc members facing said inlet.

5. The valve of claim 1 wherein said disc members are constructed such that they are maintained in substantially continuous surface bearing contact between opposed transverse extremities thereof with the adjacent surface of said orifice plate.

6. The valve of claim 1 wherein said guide means, disc members and orifice plate comprise a substantially unitary assembly thereby facilitating removal from said valve body through said openings.

7. The valve of claim 1 wherein said guide means comprises first and second members with guide surfaces of predetermined height located on each transversely opposite side of said disc members with respect to the path of movement of said discs, said transverse sides of said disc members being coextensive with the height of said guide surfaces along the flow passage axis, said first member disposed substantially close to and uniformly spaced from the adjacent transverse side of the adjacent one of said disc members and said second member disposed substantially adjacent and overlying at least a portion of the surface of said adjacent one of said disc members, whereby movement of said slide members is constrained such that said members maintained in surface bearing contact with said orifice plate during operation of said valve.

8. The valve of claim 7 wherein each of said transverse sides of said members are transversely spaced with respect to said first member in the range of between about ⅛ inch to about 3/16 inch and the tolerance between the surface of said disc member facing said inlet and said second member is about ±0.005.

9. The valve of claim 1 including a protective layer on the load-bearing and sliding surfaces of said orifice plate, said disc members and said guide means.

10. The valve of claim 1 wherein each of said disc members has a squared surface along its inner leading edge such that when said disc members are disposed in their fully closed position said leading edges are in continuous abutting relationship.

11. The valve of claim 1 wherein the fixed opening in said orifice plate is substantially circular.

12. The valve of claim 1 wherein the fixed opening in said orifice plate is substantially rectangular.

13. The valve of claim 1 wherein the fixed opening in said orifice plate is elongated.

14. The valve of claim 1 wherein said guide means includes inner surfaces facing said disc members, said surfaces having a protective layer for maintaining relative free sliding relationship between said disc members and said guide means.

15. The valve of claim 1 wherein the leading inner edges of said disc members includes central concave opposed portions such that said disc members define a minimum opening when disposed in their innermost closed position.

16. The valve of claim 1 wherein each of said disc members includes refractory means on the top and sides thereof and further protective means on the bottom thereof.

17. The valve of claim 1 wherein said orifice plate includes refractory means surrounding the fixed opening and further protective means disposed on said plate in the area between said refractory means and the outer edges thereof.

18. The valve of claim 1 wherein said discs each comprises a continuous solid member within its extremeties.

19. An improved slide valve adapted for use in the control of processes containing fluid flow with erosive materials and at high temperatures comprising in combination:

(a) a valve body comprising a wall defining a central flow passageway along a main axis connected by an inlet and an outlet for flow in only a single direction from said inlet to said outlet and having opposed openings in said wall transverse of said main axis;

(b) an orifice plate removably mounted in said valve body between said inlet and said outlet and having a fixed orifice opening disposed substantially perpendicular with respect to said main axis, said orifice plate having an inlet side which always faces said inlet and an outlet side which always faces said outlet, said orifice plate including refractory means on one surface on said inlet side thereof surrounding said fixed opening and further protective means on said refractory means and the outer edges thereof;

(c) a pair of opposed disc members each of predetermined thickness slidably mounted in said valve body substantially in the same plane as said opposed openings only on said inlet side of said orifice plate for sliding movement in direct surface bearing contact with said one surface of said orifice plate in a direction perpendicular to said main axis during operation of said valve and being supported by said orifice plate, said members constructed and arranged for providing variable flow area between opposed inner leading edges thereof with respect to said passageway and having first and second opposed surfaces spaced apart a distance corresponding to said thickness disposed substantially perpendicular with respect to said main axis, and each said member having opposed transverse sides which are coextensive with the spacing between said first and second surfaces and having a height equal to said thickness and are each disposed in a single plane at least for said thickness, refractory means on said disc on the surface thereof facing said inlet and further protective means on opposite surface thereof for facilitating relative sliding movement of said discs with respect to said orifice plate;

(d) guide means secured with said valve body only on said inlet side of said orifice plate on transversely opposite sides of said disc members with respect to their path of movement for constraining movement of said discs in a predetermined path substantially in the plane of said opposed openings in said valve body and preventing substantial transverse movement of said discs with respect to the path of movement, said guide means having inner surfaces for facilitating relatively free sliding movement between said guide means and said disc members, and defining with a portion of said one surface of said orifice plate the path of movement of said disc members, said transverse sides of said disc members being uniformly spaced from adjacent inner surfaces of said guide means.

20. The valve of claim 19 wherein said refractory means wraps around the sides of said disc members in facing relationship with respect to said guide means.

21. The valve of claim 19 wherein said discs members are continuously solid within its extremeties.

22. An improved slide valve adapted for use in the control of processes containing fluid flow with erosive materials and at high temperature comprising in combination:

(a) a valve body comprising a wall defining a central flow passageway connected by an inlet and an outlet and having opposed openings in said wall;

(b) an orifice plate removably mounted in said valve body between said inlet and said outlet and having a fixed orifice disposed substantially perpendicular with respect to the flow through said passageway, said orifice plate including refractory means on one surface at least directly adjacent said orifice opening;

(c) disc means of predetermined thickness slidably mounted in said valve body substantially in the same plane as said opposed openings for sliding movement in total bearing surface contact with said one surface of said orifice plate in a direction perpendicular to the axis of said central flow passageway when said valve is operating and being supported by said orifice plate, said disc means for providing variable flow area with respect to said passageway and having first and second opposed surfaces spaced apart a distance corresponding to said thickness disposed substantially perpendicular with respect to the axis of said flow passageway, said disc means having transverse sides coextensive with the spacing between said first and second surfaces and having a height equal to said thickness and each being disposed in a single plane at least for said thickness, refractory means on said disc means on the surface thereof facing the direction of flow and further protective means on the opposite surface thereof for facilitating relative sliding movement of said disc means with respect to said orifice plate;

(d) guide means secured with said valve body on transversely opposite sides of said disc means with respect to their path of movement for constraining movement of said disc means in a predetermined path substantially in the plane of said opposed openings in said valve body and preventing substantial transverse movement of said disc means with respect to the path of movement, said guide means having inner surfaces facing said disc means and a coating on said inner surfaces for facilitating relatively free sliding movement between said guide means and said disc means, said transverse sides of said disc means being uniformally spaced from and with respect to the adjacent inner surface of said guide means.

23. The valve of claim 22 wherein said disc means comprises a pair of opposed disc members whose leading inner edges are adjustable relative to each other for providing variable flow therebetween.

24. The valve of claim 1 wherein said disc members include a bearing contact surface which extends between said transverse sides of each of said disc members and said bearing contact surface is substantially in total surface contact with the adjacent surface of said orifice plate.

* * * * *